US008689543B2

(12) United States Patent
Numata et al.

(10) Patent No.: US 8,689,543 B2
(45) Date of Patent: Apr. 8, 2014

(54) EXHAUST PURIFICATION SYSTEM OF INTERNAL COMBUSTION ENGINE

(75) Inventors: Yoshiki Numata, Susono (JP); Kohei Yoshida, Gotenba (JP); Mikio Inoue, Susono (JP); Yuki Bisaiji, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/258,483

(22) PCT Filed: Mar. 18, 2010

(86) PCT No.: PCT/JP2010/055303
§ 371 (c)(1),
(2), (4) Date: Sep. 22, 2011

(87) PCT Pub. No.: WO2011/114540
PCT Pub. Date: Sep. 22, 2011

(65) Prior Publication Data
US 2012/0090303 A1 Apr. 19, 2012

(51) Int. Cl.
*F01N 3/00* (2006.01)
*F01N 3/10* (2006.01)

(52) U.S. Cl.
USPC ............ 60/286; 60/285; 60/301; 60/303

(58) Field of Classification Search
USPC .................. 60/285, 286, 299, 301, 303
See application file for complete search history.

(56) References Cited

U.S. PATENT DOCUMENTS

| 2008/0053073 A1* | 3/2008 | Kalyanaraman et al. ....... 60/286 |
| 2009/0000277 A1* | 1/2009 | Yoshida et al. ................ 60/286 |
| 2009/0049826 A1* | 2/2009 | Toshioka et al. .............. 60/286 |
| 2009/0151332 A1 | 6/2009 | Toshioka et al. |

FOREIGN PATENT DOCUMENTS

| JP | A-3969450 | 9/2007 |
| JP | B2-3969450 | 9/2007 |
| JP | A-2007-278120 | 10/2007 |
| JP | A-2008-19760 | 1/2008 |
| JP | A-2008-267178 | 11/2008 |
| JP | A-2009-243362 | 10/2009 |
| JP | 2010048134 A * | 3/2010 ............ F01N 3/36 |

OTHER PUBLICATIONS

International Search Report dated Jun. 29, 2010 in International Application No. PCT/JP2010/055303.

* cited by examiner

*Primary Examiner* — Audrey K Bradley
(74) *Attorney, Agent, or Firm* — Oliff PLC

(57) ABSTRACT

Inside of an engine exhaust passage, a hydrocarbon feed valve (15) and an exhaust purification catalyst (13) are arranged. On the exhaust purification catalyst (13), platinum Pt (51) is carried and a basic layer (53) is formed. The concentration of hydrocarbons which flows into the exhaust purification catalyst (13) is made to vibrate within a predetermined range of amplitude and within a predetermined range of period, whereby the $NO_x$ which is contained in the exhaust gas is reduced by the exhaust purification catalyst (13). A clogging degree detecting means is provided for detecting a degree of clogging of a nozzle opening of the hydrocarbon feed valve (15). The $NO_x$ purification rate is estimated from the degree of clogging of the nozzle opening of the hydrocarbon feed valve (15) which is detected.

14 Claims, 19 Drawing Sheets

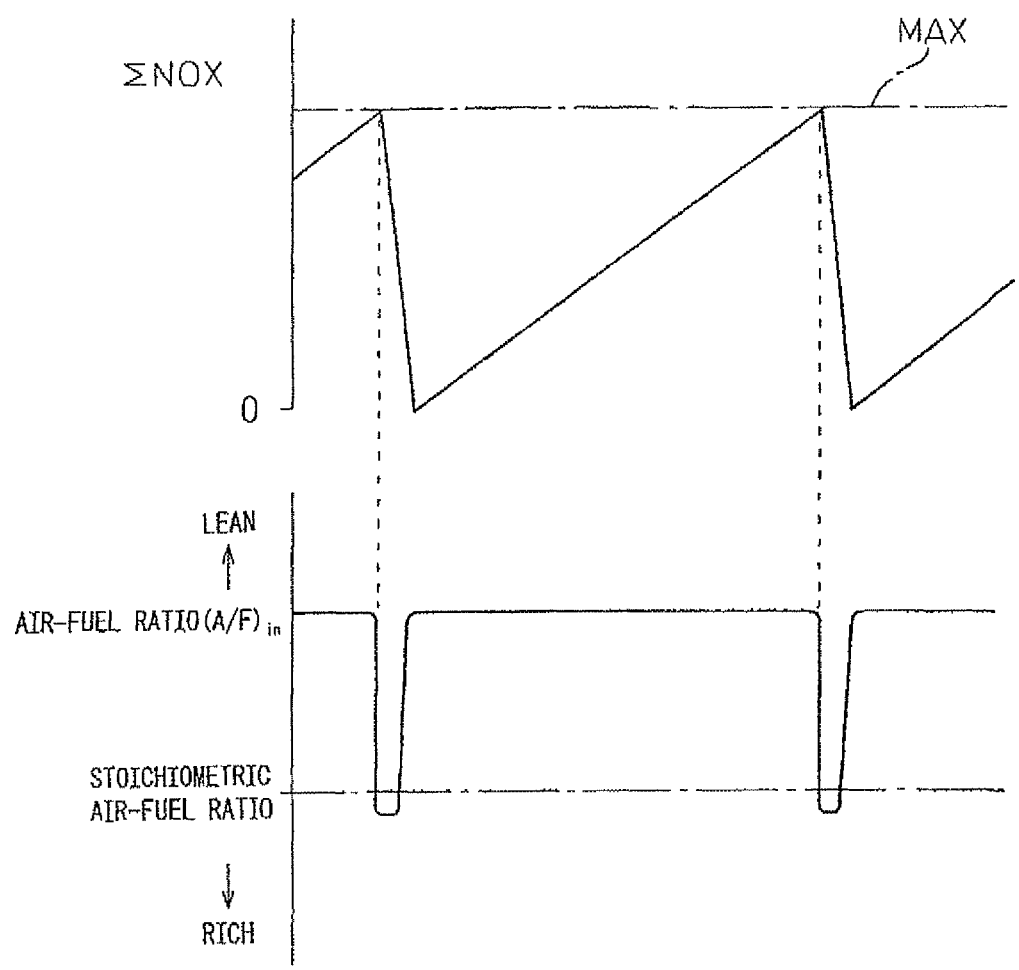

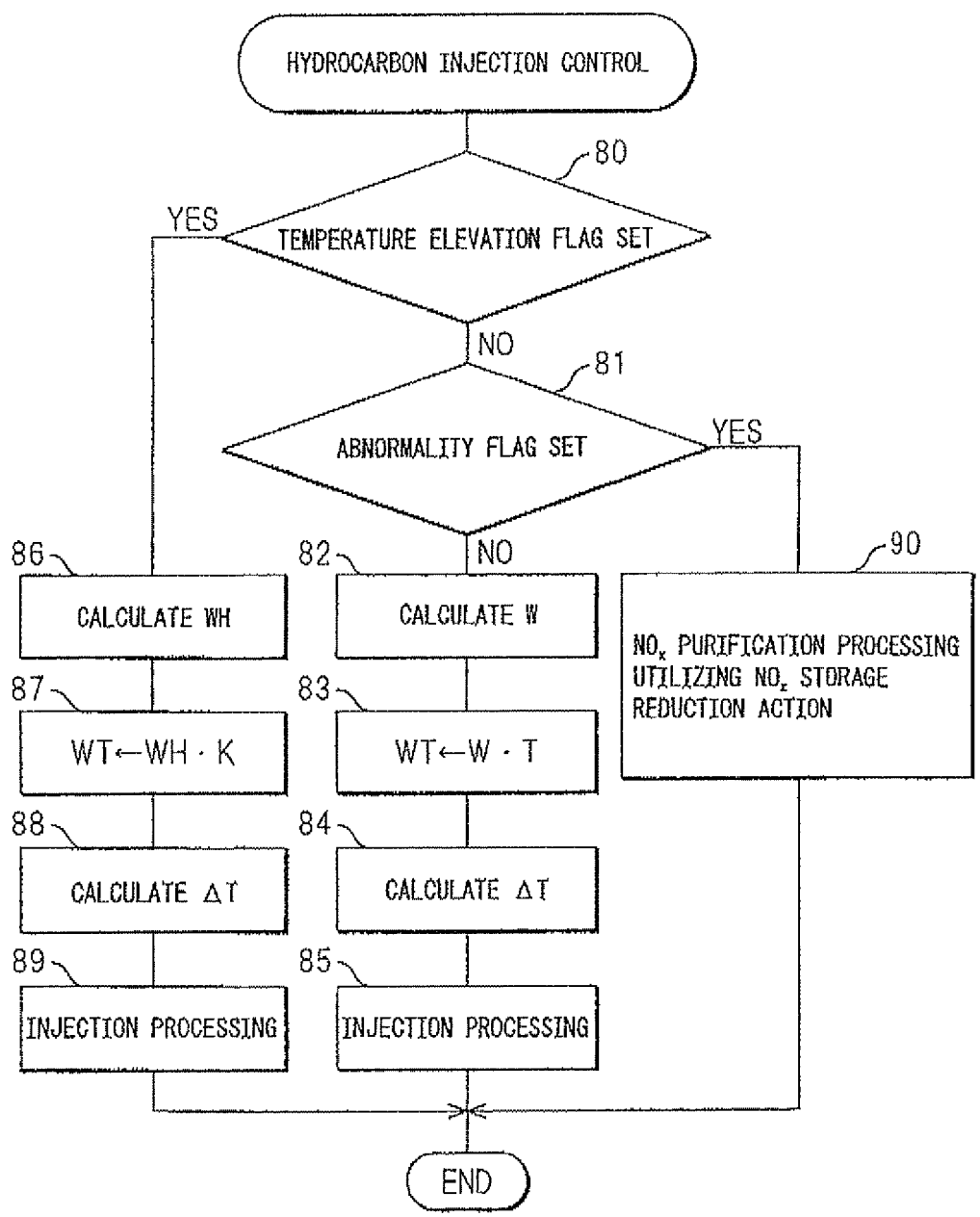

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No 3969450

SUMMARY OF INVENTION

Technical Problem

However, there is the problem that when the $NO_x$ storage catalyst becomes a high temperature, the $NO_x$ purification rate falls.

An object of the present invention is to provide en exhaust purification system of an internal combustion engine which can obtain a high $NO_x$ purification rate even if the temperature of the exhaust purification catalyst becomes a high temperature and which can estimate a drop in the $NO_x$ purification rate.

Solution to Problem

According to the present invention, there is provided an exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and referred hydrocarbons is arranged downstream of the hydrocarbon feed valve inside of the engine exhaust passage, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if a predetermined amount of hydrocarbons is injected by a predetermined feed period from the hydrocarbon feed valve and has a property of being increased in storage amount of $NO_x$ which is contained in exhaust gas if lengthening the feed period of the hydrocarbons more than the predetermined feed period, clogging degree detecting means is provided for detecting a degree of clogging of a nozzle opening of the hydrocarbon feed valve, at the time of engine operation, the predetermined amount of hydrocarbons is injected from the hydrocarbon feed valve by the predetermined feed period, and, at this time, an $NO_x$ purification rate is estimated from the clogging degree of the nozzle opening of the hydrogen feed valve which is detected by the clogging degree detecting means.

Advantageous Effects of Invention

Even if the temperature of the exhaust purification catalyst becomes high, a high $NO_x$ purification rate can be obtained. Further, by detecting the clogging degree of a nozzle opening of a hydrocarbon feed valve, it is possible to estimate a drop in the $NO_x$ purification rate.

BRIEF DESCRIPTION OF DRAWINGS

FIG. 8 is a view showing change in the air-fuel ratio of the exhaust gas flowing to the exhaust purification catalyst etc.

FIG. 30 is a flow chart for injection control of hydrocarbons.

DESCRIPTION OF EMBODIMENTS

Figure 1:
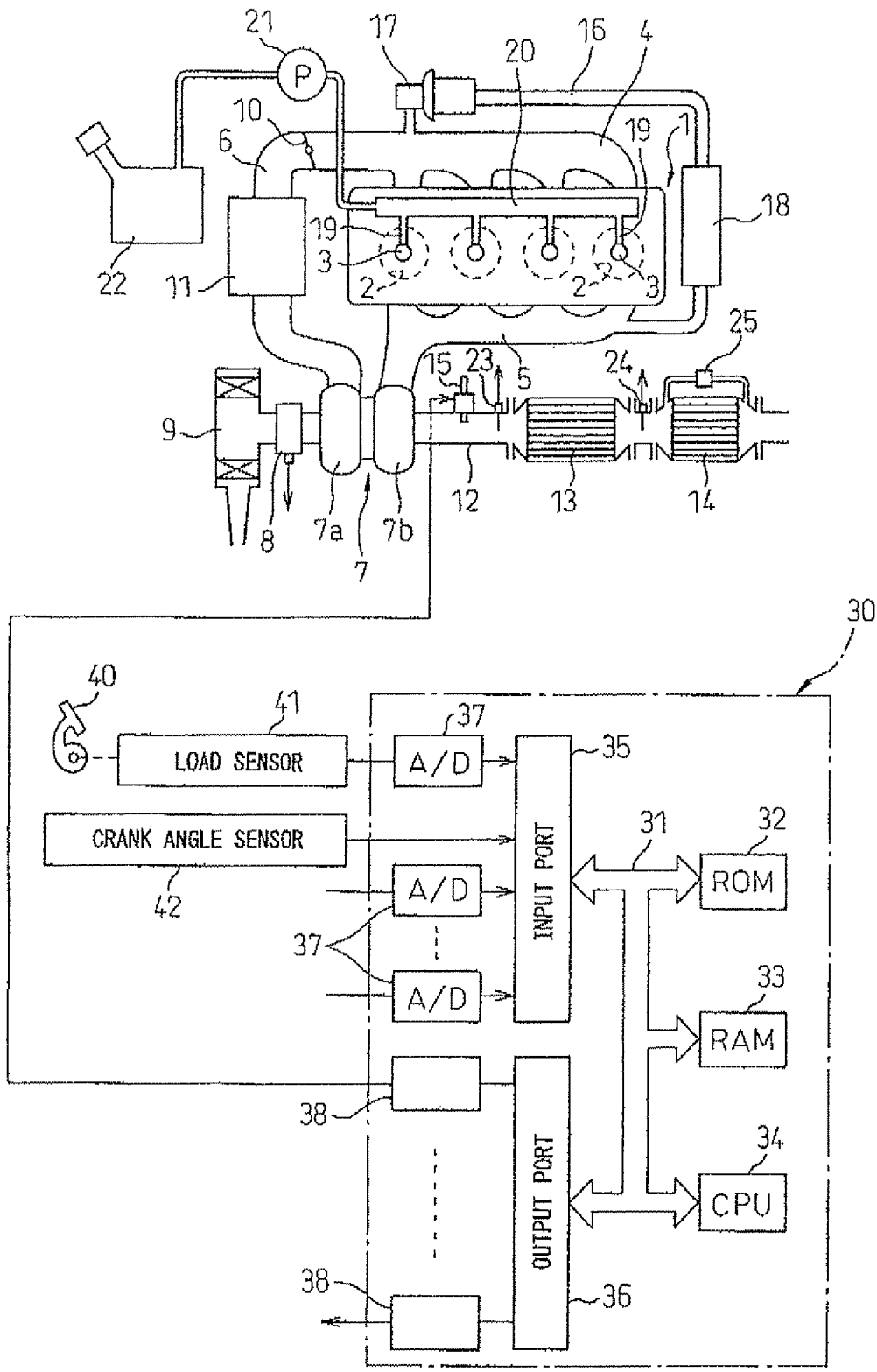
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream and downstream of the exhaust purification catalyst 13, temperature sensors 23 and 24 are respectively attached to detect the exhaust gas temperature. At the particulate filter 14, a differential pressure sensor 25 is attached for detecting a differential pressure before and after the particulate filter 14. The output signals of these temperature sensors 23 and 24, differential pressure sensor 25, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, EGR control valve 17, and fuel pump 21.

Figure 2:
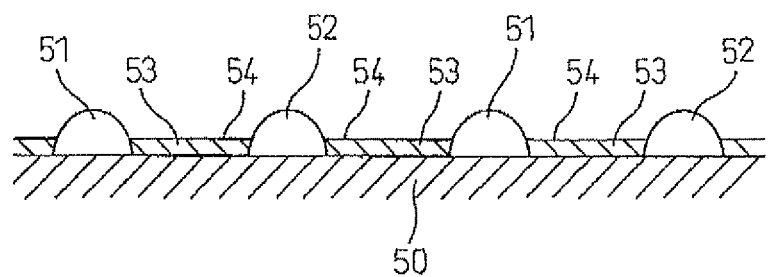
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
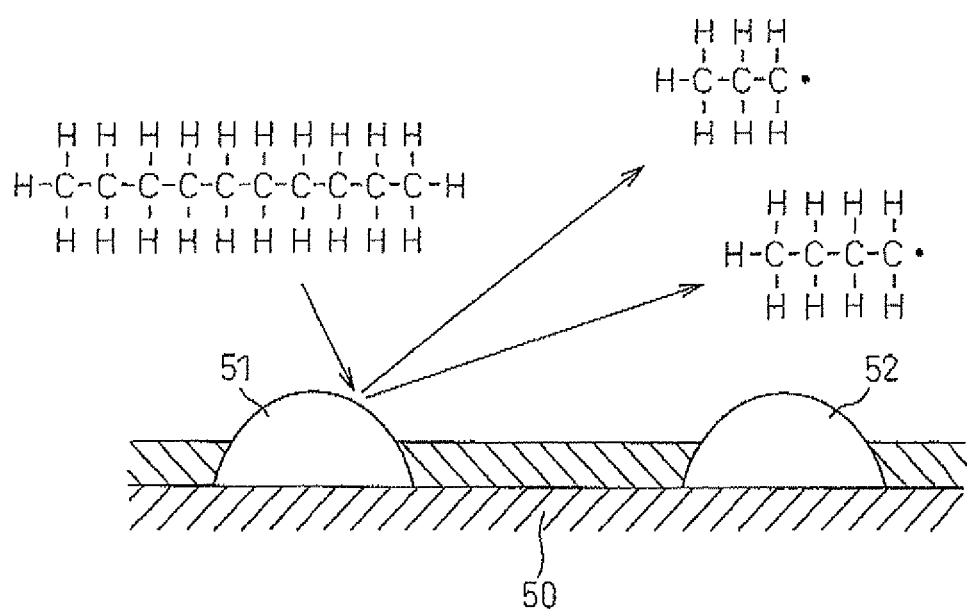
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG.

3, the hydrocarbons HC which are injected from the hydrocarbon feed valve 15 become radical hydrocarbons HC with a small carbon number by the catalyst 51.

Figure 4:
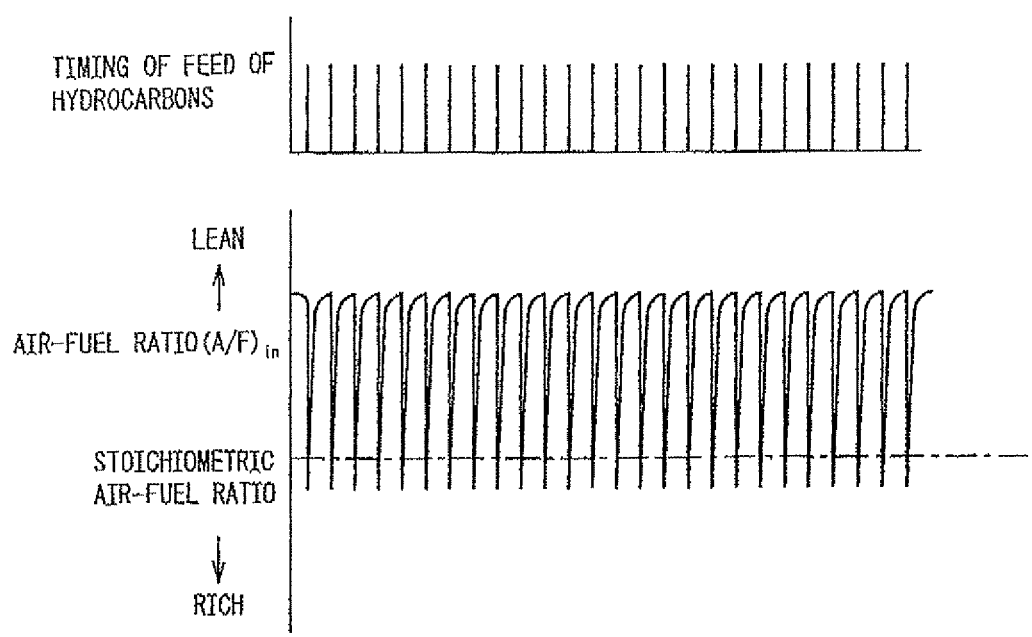
FIG. 4 is a view showing a change of an air-fuel ratio of exhaust gas flowing into an exhaust purification catalyst.

FIG. 4 shows the timing of feeding hydrocarbons from the hydrocarbon feed valve 15 and changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
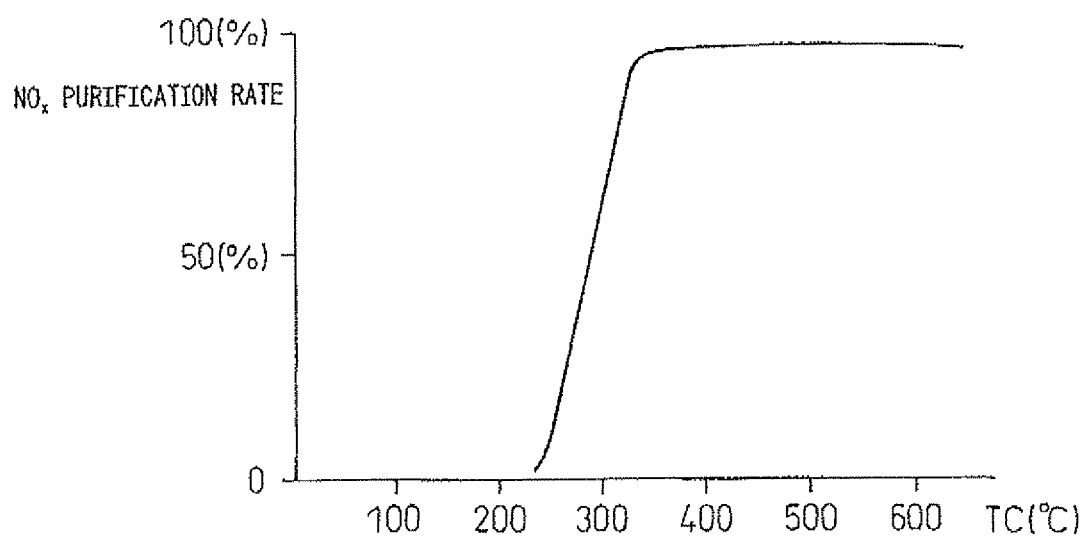
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
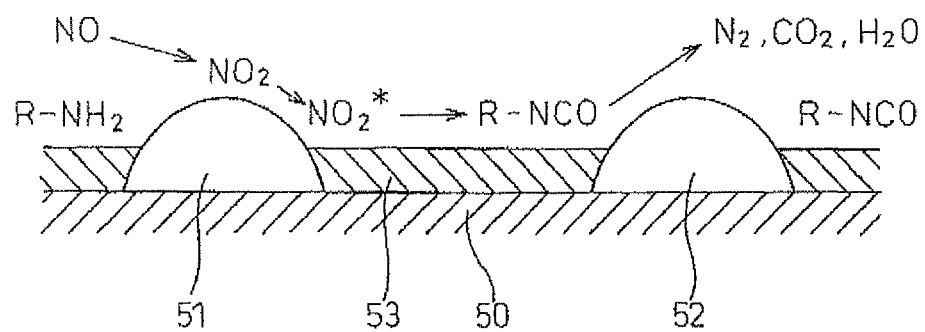
FIGS. 6A and 6B are views for explaining an oxidation reduction reaction in an exhaust purification catalyst.
Figure 6B:
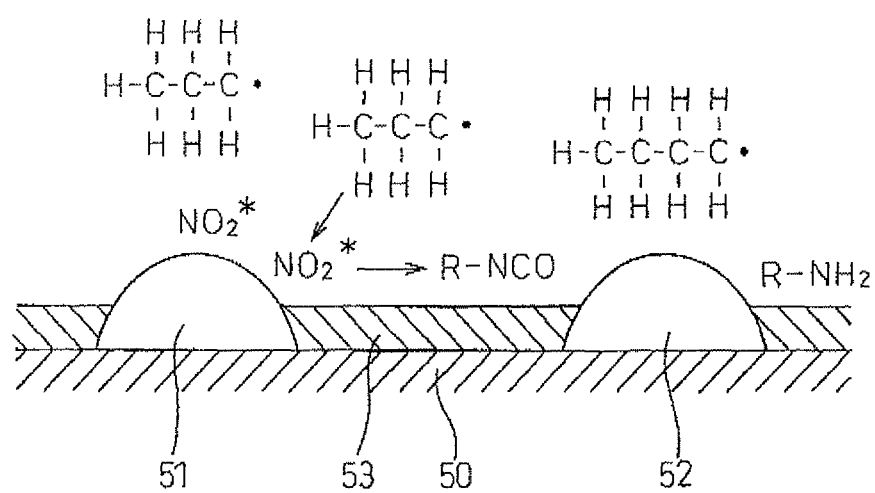

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when the hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. If this nitro compound R—NCO is hydrolyzed, it becomes the amine compound R—$NH_2$. However, in this case, what is hydrolyzed is considered to be part of the isocyanate compound R—NCO. Therefore, as shown in. FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. To hold the produced reducing intermediate R—NCO or R—$NH_2$ inside the exhaust purification catalyst 13, a basic exhaust gas flow surface part 54 is formed around the precious metal catalysts 51 and 52. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
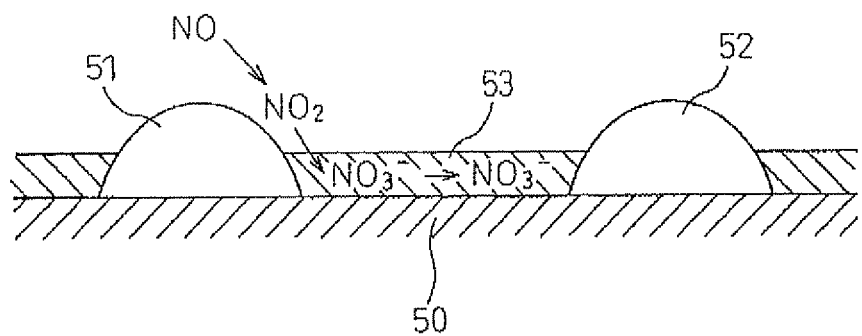
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
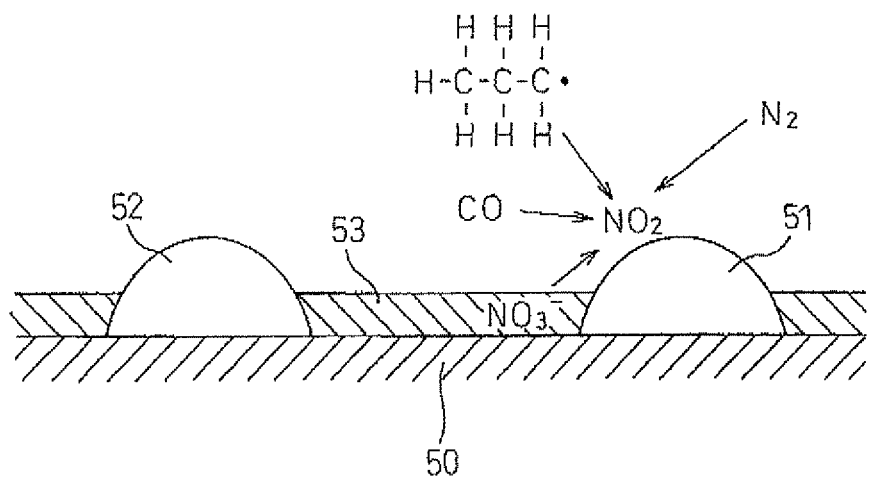

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if referring to the ratio of the air and fuel (hydrocarbons) which are supplied into the engine intake passage, combustion chambers 2, and exhaust passage upstream of the exhaust purification catalyst 13 as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

FIG. 8 shows a $NO_x$ purification method utilizing the adsorption and release action of $NO_x$. That is, in this $NO_x$ purification method, as shown in FIG. 8, when the stored $NO_x$ amount $\Sigma$NOX which is stored in the basic layer 53 exceeds a predetermined allowable amount MAX, the air-fuel ratio (A/F)in of the exhaust gas which flows into the exhaust purification catalyst 13 is temporarily made rich. If the air-fuel ratio (A/F)in of the exhaust gas is made rich, the $NO_x$ which was absorbed in the basic layer 53 when the air-fuel ratio (A/F)in of the exhaust gas is lean, is released all at once from the basic layer 53 and reduced. Due to this, the $NO_x$ is removed.

Figure 9:
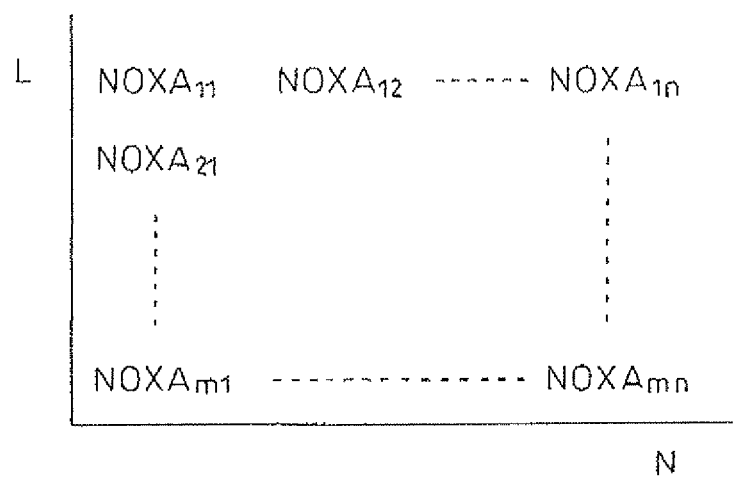
FIG. 9 is a view showing a map of an exhausted $NO_x$ amount NOXA.

The stored $NO_x$ amount $\Sigma$NOX is, for example, calculated from the $NO_x$ amount which is exhausted from the engine. In an embodiment of the present invention, the exhausted $NO_x$ amount NOXA which is exhausted from the engine per unit time is stored as a function of the engine load L and engine speed N in the form of a map such as shown in FIG. 9 in advance in the ROM 32. The stored $NO_x$ amount $\Sigma$NOX is calculated from this exhausted $NO_x$ amount NOXA. The period by which the air-fuel ratio (A/F)in of the exhaust gas is made rich is far longer than the period by which the air-fuel ratio (A/F)in of the exhaust gas is lowered as shown in FIG. 4. The period by which the air-fuel ratio (A/F)in of the exhaust gas is made rich is usually 1 minute or more.

Figure 10:
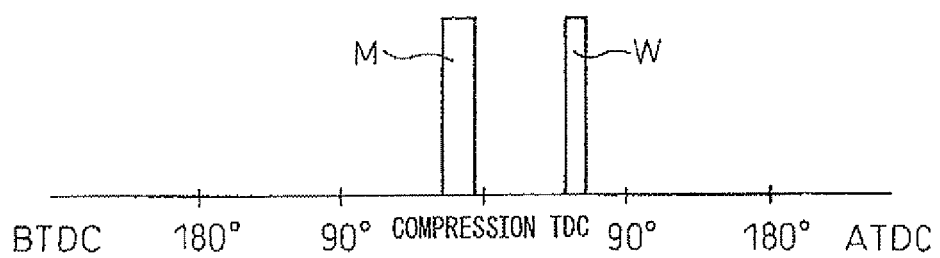
FIG. 10 is a view showing a fuel injection timing.

Further, in this $NO_x$ purification method, as shown in FIG. 10, in addition to the combustion use fuel M from a fuel injector 3, additional fuel W is injected into the combustion chamber 2 whereby the air-fuel ratio (A/F)in of the exhaust gas flowing into the exhaust purification catalyst 13 is made rich. Note that, the abscissa of FIG. 10 shows the crank angle. This additional fuel W is injected at a timing where it burns, but does not appear as engine output, that is, slightly before ATDC90° after compression top dead center. Of course, in this case, it is also possible to make the feed amount of hydrocarbons from the hydrocarbon feed valve 15 increase so as to make the air-fuel ratio (A/F)in of the exhaust gas rich.

Figure 11:
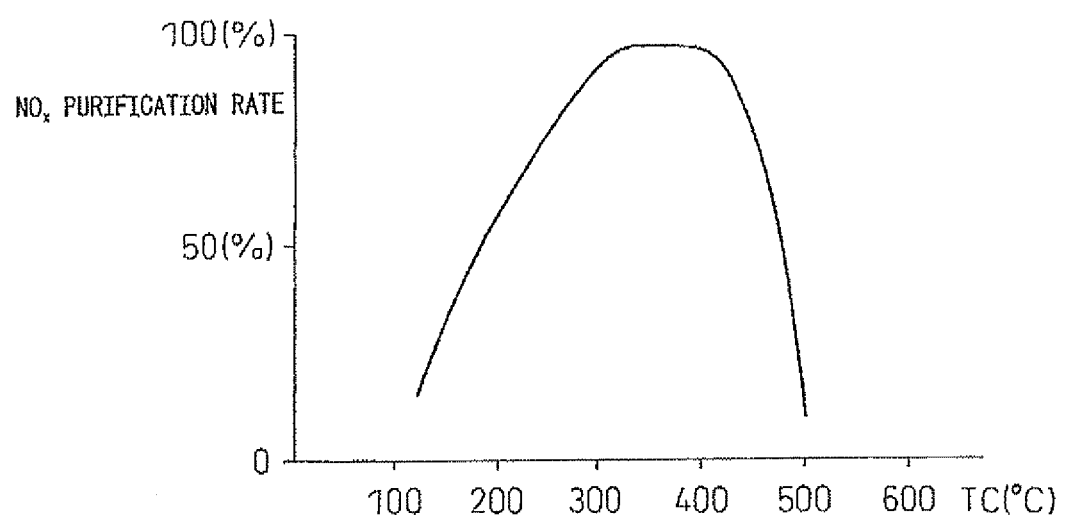
FIG. 11 is a view showing an $NO_x$ purification rate.

FIG. 11 shows the $NO_x$ purification rate when making the exhaust purification catalyst 13 function as an $NO_x$ storage catalyst. Note that, the abscissa of the FIG. 11 shows the catalyst temperature TC of the exhaust purification catalyst 13. When making the exhaust purification catalyst 13 function as an $NO_x$ storage catalyst, as shown in FIG. 11, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for reacting $NO_x$ contained in exhaust gas and reformed hydrocarbons is arranged inside of an engine exhaust passage downstream of the hydrocarbon feed valve 15, and precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in exhaust gas if the hydrocarbon feed valve 15 injects the predetermined amount of hydrocarbons by a predetermined feed period and has the property of being increased in storage amount of $NO_x$ which is contained in exhaust gas if lengthening the feed period of the hydrocarbons more than the predetermined feed period. At the time of engine operation, usually, the above predetermined amount of hydrocarbons is injected from the hydrocarbon feed valve 15 by the above-mentioned predetermined feed period. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst.

Next, while referring to FIG. 12 to FIG. 17, the new $NO_x$ purification method shown in FIG. 4 to FIGS. 6A and 6B will be explained in a bit more detail.

Figure 12:
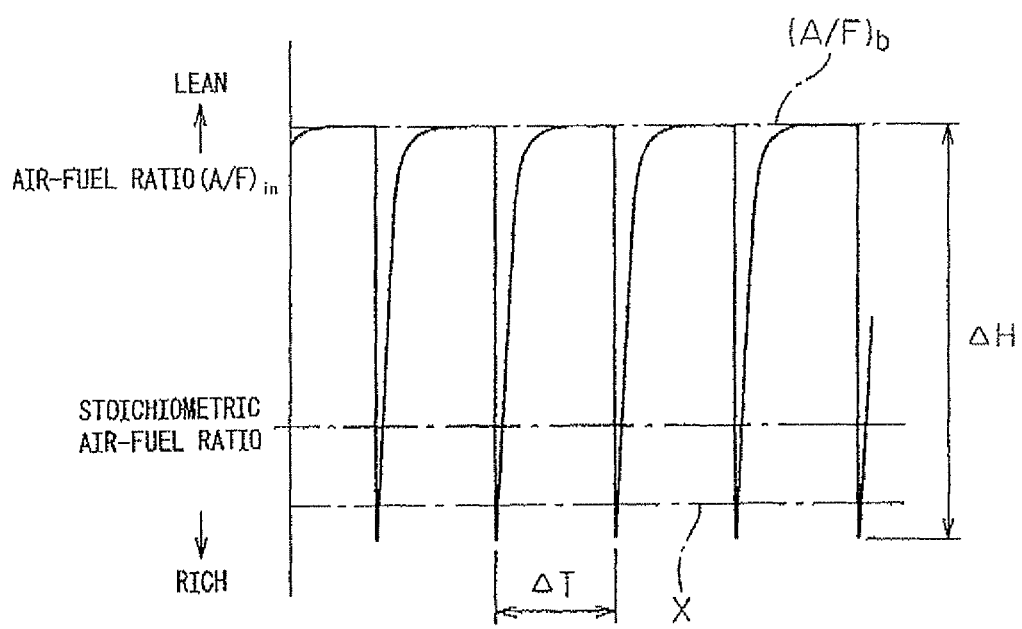
FIG. 12 is a time chart showing a change of an air-fuel ratio of exhaust gas flowing into an exhaust purification catalyst.

FIG. 12 shows enlarged the changes in the air-fuel ratio (A/F)in shown in FIG. 4. Note that, as explained above, the changes in the air-fuel ratio (A/F)in of the exhaust gas flowing into this exhaust purification catalyst 13 simultaneously show the changes in the concentration of hydrocarbons flowing into the exhaust purification catalyst 13. Note that, in FIG. 12, $\Delta H$ shows the amplitude of the changes in concentration of hydrocarbons HC flowing into the exhaust purification catalyst 13, while $\Delta T$ shows the vibration period of the concentration of hydrocarbons flowing into the exhaust purification catalyst 13.

Furthermore, in FIG. 12, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 12, X shows the upper limit of the air-fuel ratio (A/F)in which is used for forming the reducing intermediate without the active $NO_2^*$ formed being stored in the form of nitrates in the base layer 53. To make the active $NO_2^*$ and the reformed hydrocarbons react and produce the reducing intermediate, it is necessary to make the air-fuel ratio (A/F)in lower than the upper limit X of this air-fuel ratio.

In other words, in FIG. 12, X shows the lower limit of the concentration of hydrocarbons required for making the active $NO_2^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2^*$, that is, the air-fuel ratio (A/F)in. The upper limit X of the air-fuel ratio required for producing the reducing intermediate will below be called the demanded minimum air-fuel ratio.

In the example shown in FIG. 12, the demanded minimum air-fuel ratio X becomes rich. Therefore, in this case, to produce the reducing intermediate, the air-fuel ratio (A/F)in is instantaneously made the demanded minimum air-fuel ratio X or less, that is, is made rich. As opposed to this, in the example shown in FIG. 13, the demanded minimum air-fuel ratio X becomes lean. In this case, the reducing intermediate is produced by maintaining the air-fuel ratio (A/F)in lean and periodically making the air-fuel ratio (A/F)in fall.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 13:
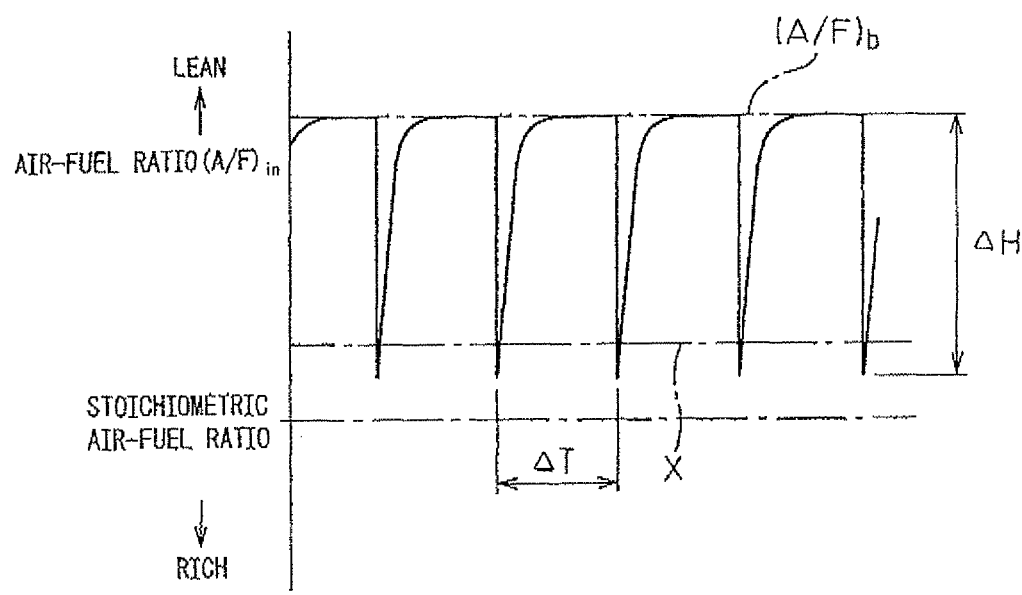
FIG. 13 is a time chart showing a change of an air-fuel ratio of exhaust gas flowing into an exhaust purification catalyst.

Now, if using an exhaust purification catalyst 13 with a strong oxidizing strength, as shown in FIG. 13, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 12, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 13, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 12, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 14:
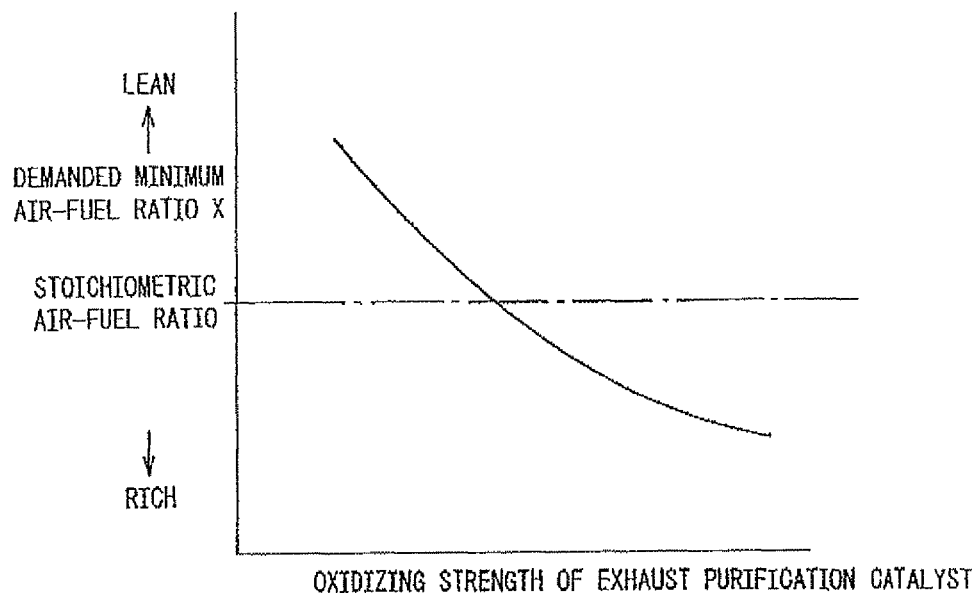
FIG. 14 is a view showing a relationship between an oxidizing strength of an exhaust purification catalyst and a demanded minimum air-fuel ratio X.

That is, it is learned that the demanded minimum air-fuel ratio X, as shown in FIG. 14, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust as before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 15:
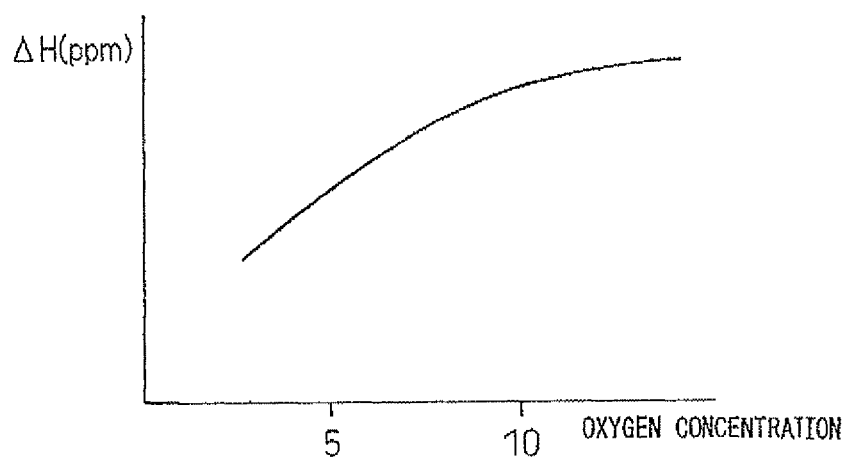
FIG. 15 is a view showing a relationship between an oxygen concentration in exhaust gas and an amplitude ΔH of a hydrocarbon concentration giving the same $NO_x$ purification rate.

FIG. 15 shows the relationship between the oxygen concentration in the exhaust gas before the hydrocarbons are fed and the amplitude ΔH of the hydrocarbon concentration when the same $NO_x$ purification rate is obtained. From FIG. 15, it is learned that to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 16:
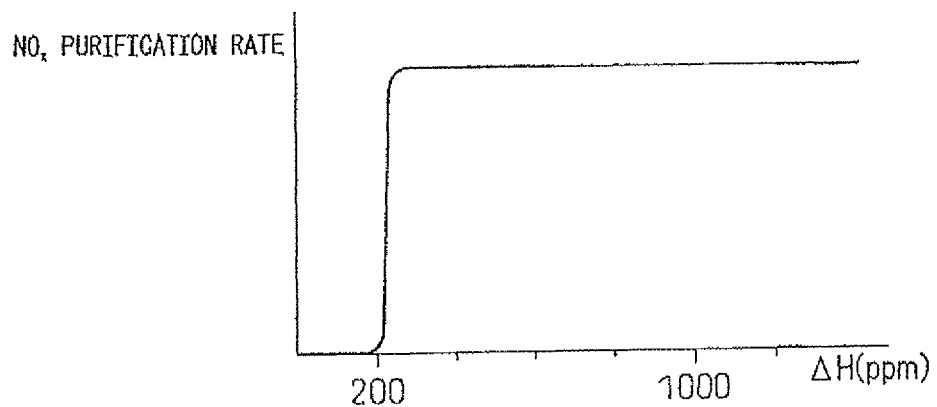
FIG. 16 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 16, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Further, if the amplitude ΔH of the hydrocarbon concentration is over 10000 ppm, there is the danger that the air-fuel ratio (A/F)in will become rich. Therefore, there is the danger that the new $NO_x$ purification method which is shown from FIG. 4 to FIGS. 6A and 6B can no longer be performed. Therefore, in the present invention, the predetermined range of the amplitude of the hydrocarbon concentration is made 200 ppm to 10000 ppm.

Figure 17:
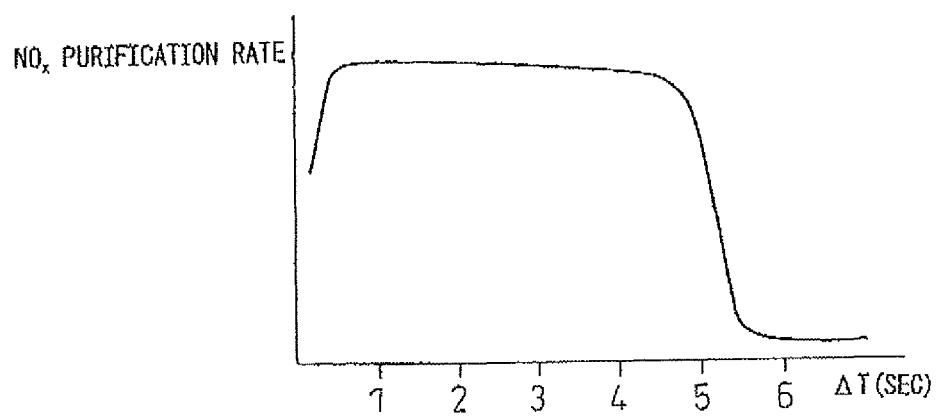
FIG. 17 is a view showing a relationship of a vibration period ΔT of a hydrocarbon concentration and an $NO_x$ purification rate.

Further, if the vibration period ΔT of the hydrocarbon concentration becomes longer, the oxygen concentration around the active $NO_2$* becomes higher in the time after the hydrocarbons are fed to when the hydrocarbons are next fed. In this case, if the vibration period ΔT of the hydrocarbon concentration becomes longer than about 5 seconds, the active $NO_2$* starts to be absorbed in the form of nitrates inside the basic layer 53. Therefore, as shown in FIG. 17, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 17, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Now, in an embodiment of the present invention, by changing the injection amount and injection timing of hydrocarbons from the hydrocarbon feed valve 15, the amplitude ΔH and the vibration period ΔT of the hydrocarbon concentration are controlled to the optimum values in accordance with the operating state of the engine, that is, so that a good $NO_x$ purification action is performed by the new $NO_x$ purification method. In this case, in this embodiment of the present invention, the injection amount of hydrocarbons is determined by controlling the injection time of the hydrocarbons of the hydrocarbon feed valve 15.

Figure 18:
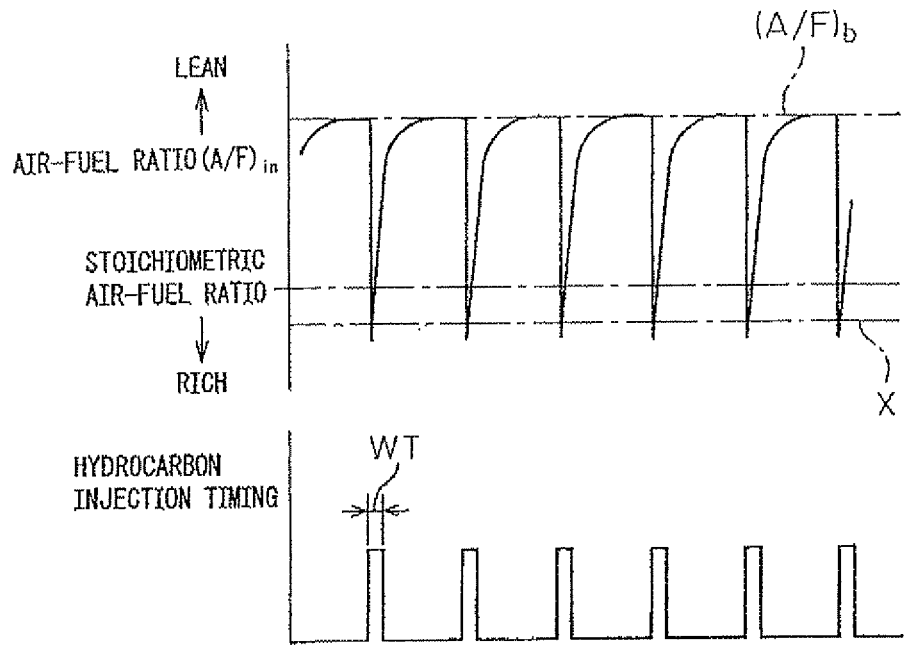
FIG. 18 is a time chart showing changes in an air-fuel ratio of exhaust gas flowing into an exhaust purification catalyst etc.
Figure 19:
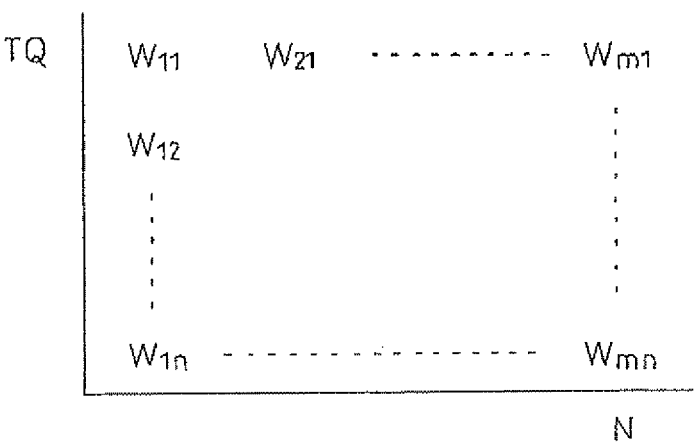
FIG. 19 is a view showing a map of an injection time W of hydrocarbons.

FIG. 18 shows the change in concentration of hydrocarbons flowing to the exhaust purification catalyst 13, that is, the change in the air-fuel ratio (A/F)in of the exhaust gas flowing to the exhaust purification catalyst 13, and the injection time WT of hydrocarbons in a certain representative engine operating state. The injection time WT of hydrocarbons which enables a good $NO_x$ purification action to be secured by the new $NO_x$ purification method changes in accordance with the operating state of the engine. In this embodiment according to the present invention, this injection time W of hydrocarbons is stored as a function of the demanded torque TQ of the engine and the engine speed N in the form of the map such as shown in FIG. 19 in advance in the ROM 32. The injection time WT from the hydrocarbon feed valve 15 is usually made the injection time W which is calculated from the map of FIG. 19.

Figure 20:
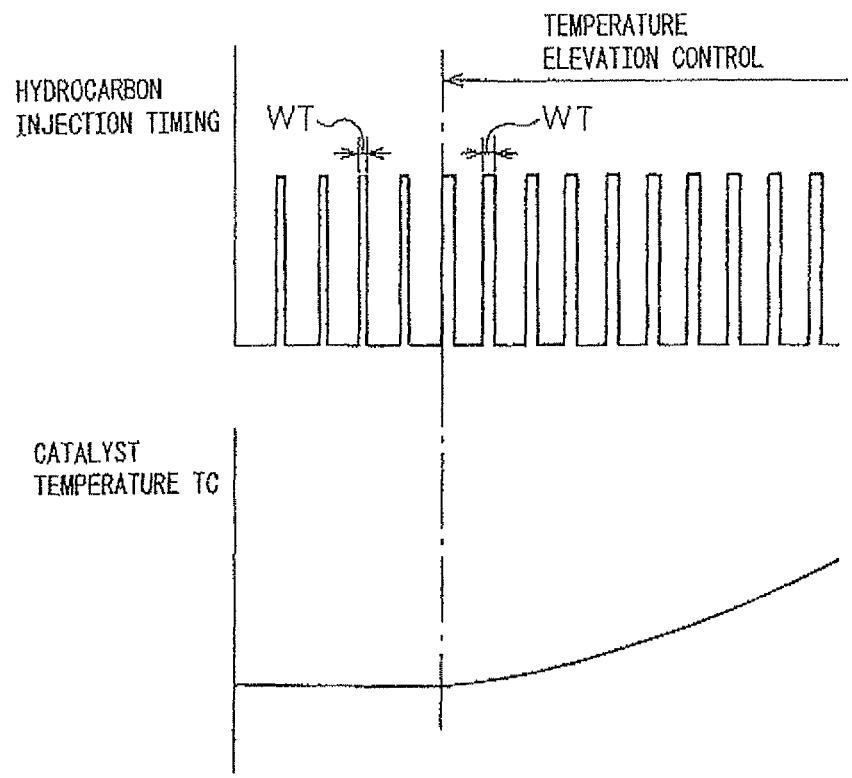
FIG. 20 is a view showing changes in an actual injection time WT of hydrocarbons.

Now, in this embodiment according to the present invention, when raising the temperature of the exhaust purification catalyst 13 or other catalyst or the particulate filter 14 for a purpose other than engine warmup, the injection amount of hydrocarbons from the hydrocarbon feed valve 15 is increased. FIG. 20, as one example, shows the temperature elevation control when the particulate filter 14 should be regenerated and the temperature of the particulate filter 14 is raised up to the target temperature of about 600° C.

At this time, as will be understood from FIG. 20, if temperature elevation control is started, the injection time WT of hydrocarbons is increased. On the other hand, if the injection time WT of hydrocarbons is made to increase in this way, the increase in the heat of oxidation reaction of the hydrocarbons causes the temperature of the particulate filter 14 to rise. At this time, as shown in FIG. 20, the temperature TC of the exhaust purification catalyst 13 also rises.

In this regard, the injection amount of hydrocarbons necessary for making the temperature of the particulate filter 14 rise up to a 600° C. or so target temperature and maintaining it at that target temperature is a function of the amount of the exhaust gas, that is, the intake air amount and the exhaust gas temperature. In this embodiment according to the present invention, the reference injection time WH of the hydrocarbons necessary for making the temperature of the particulate filter 14 rise to the target temperature and maintain it at that target temperature is stored as a function of the intake air amount GA and the exhaust gas temperature TE in the form of a map such as shown in FIG. 21 in advance in the ROM 32.

Figure 21:
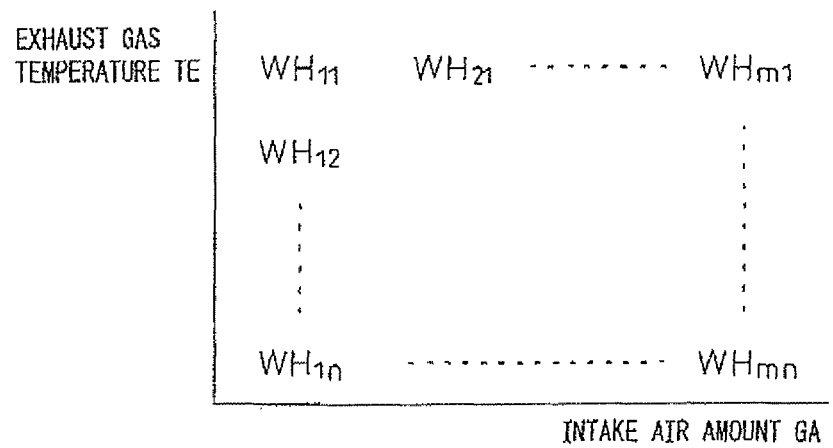
FIG. 21 is a view showing a map of an injection time WH of hydrocarbons.
Figure 22:
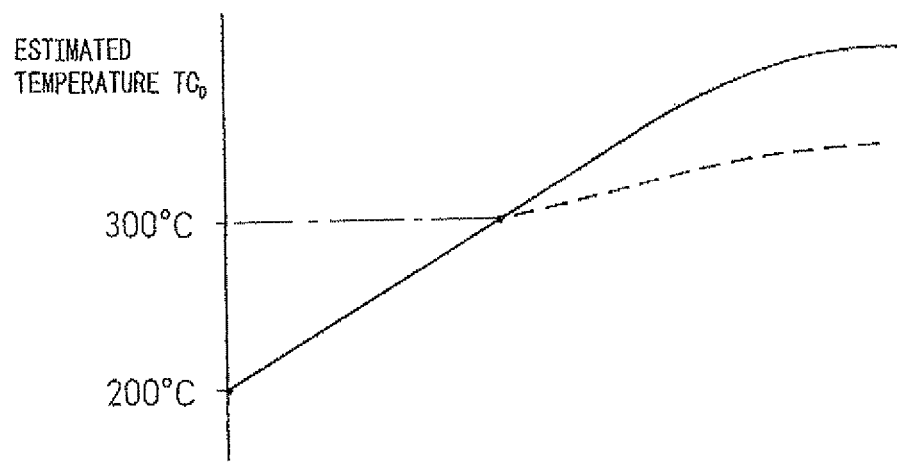
FIG. 22 is a view showing changes in an estimated temperature $TC_0$ of an exhaust purification catalyst.

When hydrocarbons are normally injected from the hydrocarbon feed valve 15, if making the injection time of the hydrocarbons the injection time WH which is calculated from the map of FIG. 21, the temperature of the particulate filter 14 is raised to the target temperature and is maintained at the target temperature. The solid line shown in FIG. 22 shows the change in the temperature $TC_0$ of the exhaust purification catalyst 13 at this time. When hydrocarbons are normally injected from the hydrocarbon feed valve 15, regardless of the temperature of the exhaust purification catalyst 13 when temperature elevation control is started, the temperature $TC_0$ of the exhaust purification catalyst 13 rises along the solid line shown in FIG. 22. That is even if the temperature elevation control is started when the temperature $TC_0$ of the exhaust purification catalyst 13 is 200° C. or even if the temperature elevation control is started when the temperature $TC_0$ of the exhaust purification catalyst 13 is 300° C., the temperature $TC_0$ of the exhaust purification catalyst 13 rises along the solid line shown in FIG. 22.

Therefore, when hydrocarbons are normally injected from the hydrocarbon feed valve 15, the temperature $TC_0$ of the exhaust purification catalyst 13 is estimated to be one which rises from the temperature at the time of start of temperature elevation control along the solid line of FIG. 22. Therefore, in this embodiment according to the present invention, the $TC_0$ in FIG. 22 is called the estimated temperature. The change in the estimated temperature $TC_0$ which is shown by the solid line in FIG. 22 is stored in advance.

Now, assume that the temperature elevation control is started when of the actual temperature of the exhaust purification catalyst 13 is 300° C. At this time, if the injection time WT of hydrocarbons is made the reference injection time WH which was calculated from the map shown in FIG. 21 and hydrocarbons were normally injected from the hydrocarbon feed valve 15, the actual temperature TC of the exhaust purification catalyst 13 rises along the estimated temperature $TC_0$ shown by the solid line in FIG. 22. At this time, the temperature of the particulate filter 14 is made to rise to the target temperature and is maintained at the target temperature.

As opposed to this, if the nozzle opening of the hydrocarbon feed valve 15 becomes clogged when the temperature elevation control is started and the injection time WT of hydrocarbons is made the reference injection time WH which is calculated from the map shown in FIG. 21, the injection amount of hydrocarbons will be decreased compared with the normal injection amount. As a result, the actual temperature TC of the exhaust purification catalyst 13, as shown by the broken line in FIG. 22, will not rise to the estimated temperature $T_0$. At this time, the temperature of the particulate filter 14 no longer rises to the target temperature.

Therefore, in this embodiment according to the present invention, at this time, the injection time of the hydrocarbons is increased so that the actual temperature TC of the exhaust purification catalyst 13 rises along the estimated temperature $TC_0$ shown by the solid line in FIG. 22. Specifically speaking, at this time, the reference injection time WH which is calculated from the map shown in FIG. 21 is multiplied with an increase coefficient K (>1.0) so that the injection amount of hydrocarbons becomes equal to the injection amount of hydrocarbons at normal times. Therefore, at this time, the temperature of the particulate filter 14 is made to rise to the target temperature and is maintained at the target temperature.

Figure 23:
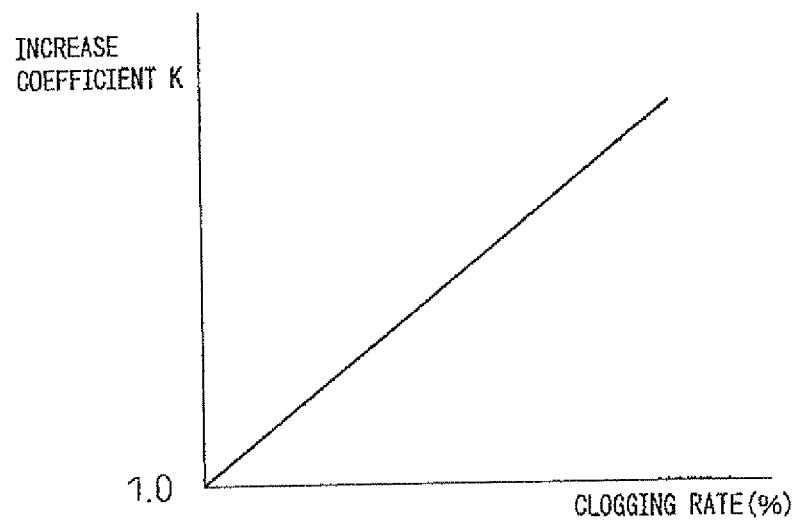
FIG. 23 is a view showing the relationship between a clogging rate and an increase coefficient K.

Now, the value of the increase coefficient K which is multiplied with the reference injection time WH becomes larger the more the effective area of the nozzle opening of the hydrocarbon feed valve 15 is decreased, that is, the more the clogging rate of the nozzle opening of the hydrocarbon feed valve 15 is increased. FIG. 23 shows the relationship between the increase coefficient K and the clogging rate. From FIG. 23, it will be understood that the larger the clogging rate, the more the value of the increase coefficient K increases.

As explained above, when the nozzle opening of the hydrocarbon feed valve 15 becomes clogged, the injection amount of hydrocarbons is decreased, so a good temperature elevation action can no longer be performed. However, at this time, the injection time of the hydrocarbons is increased so that a good temperature elevation action is obtained. On the other hand, if the nozzle opening of the hydrocarbon feed valve 15 clogs, the $NO_x$ purification rate will fall. However, at this time, even if the injection time of the hydrocarbons increases, the $NO_x$ purification rate will not increase that much. This will be explained with reference to FIGS. 24A and 24B and FIG. 25.

Figure 24A:
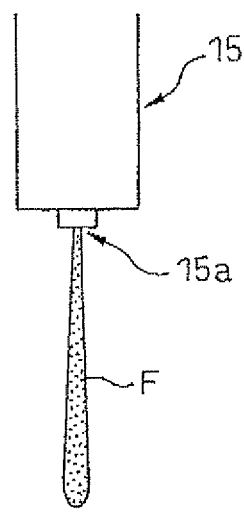
FIGS. 24A and 24B are views showing states of injection of hydrocarbons.
Figure 24B:
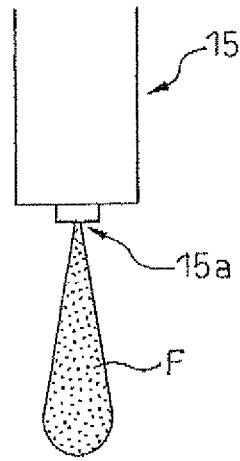
Figure 25:
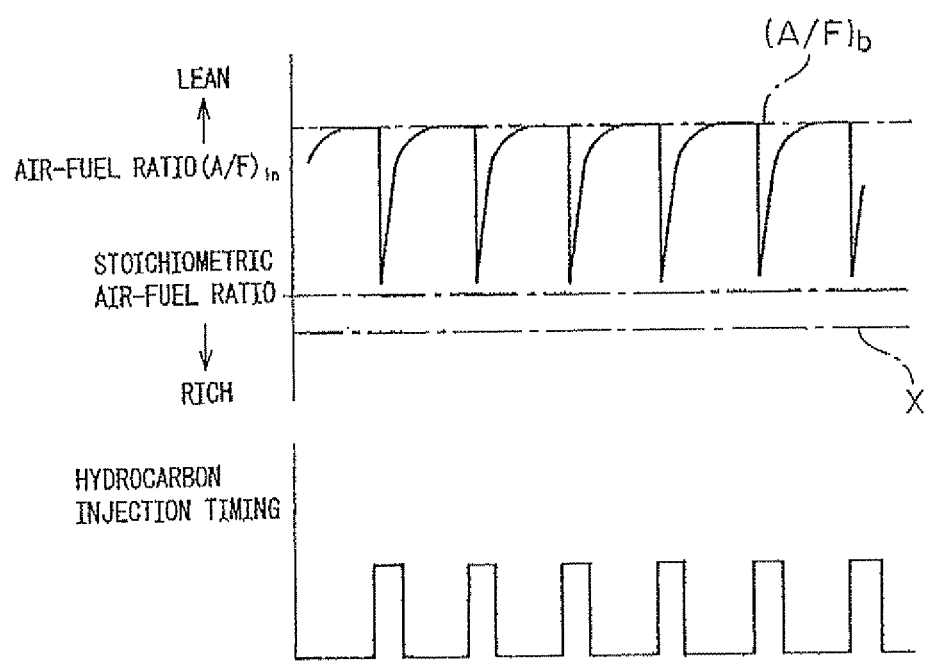
FIG. 25 is a time chart showing changes in the air-fuel ratio of the exhaust gas flowing to the exhaust purification catalyst etc.

FIG. 24A shows the case where the nozzle opening 15a of the hydrocarbon feed valve 15 is not clogged, while FIG. 24B shows the case where the nozzle opening 15a is clogged. If the nozzle opening 15a is clogged, the effective area of the nozzle opening 15a will become smaller. As a result, the injection amount will decrease and, as shown in FIG. 24B, the spread angle of the atomized fuel F will increase. If the injection amount decreases in this way and the spread angle of the atomized fuel F increases; the concentration of the injected hydrocarbons falls, so, as shown in FIG. 25, the air-fuel ratio (A/F)in no longer becomes the demanded minimum air-fuel ratio X or less. As a result, the $NO_x$ purification rate falls.

In this regard, in this embodiment according to the present invention, when the nozzle opening 15a is clogged, the injection time of hydrocarbons is increased so that the injection amount of hydrocarbons becomes equal to the injection amount at the time of normal operation. However, when the nozzle opening 15a is clogged, even if the injection time of the hydrocarbons is increased, as shown in FIG. 24B, the atomized fuel F spreads. Therefore, even in this, the concentration of the injected hydrocarbons fall, so as shown in FIG. 25, the air-fuel ratio (A/F)in will no longer become the demanded minimum air-fuel ratio X or less. As a result, the $NO_x$ purification rate falls.

That is, when using the new $NO_x$ purification method according to the present invention, the higher the clogging rate of the nozzle opening 15a and the more the concentration of hydrocarbons injected falls, the lower the $NO_x$ purification rate becomes. That is, when using the new $NO_x$ purification method according to the present invention, it is possible to use the clogging rate of the nozzle opening 15a, that is, the degree of clogging of the nozzle opening 15a, to estimate the $NO_x$ purification rate. Therefore, in the present invention, a clogging degree detecting means is provided for detecting the degree of clogging of the nozzle opening 15a of the hydrocarbon feed valve 15. When the new $NO_x$ purification method according to the present invention is used, the $NO_x$ purification rate is estimated from the degree of clogging of the nozzle opening 15a of the hydrocarbon feed valve 15 which is detected by the clogging degree detecting means.

On the other hand, in this embodiment according to the present invention, as explained above, an temperature elevation control which raises the temperature of the catalyst or particulate filter 14 arranged inside of an engine exhaust passage to a target temperature by increasing the injection time of hydrocarbons from the hydrocarbon feed valve 15 is performed. In this case, if the nozzle opening 15a is clogged, the injection time of the hydrocarbons increases. At this time, as shown in FIG. 23, the clogging rate, that is, the clogging degree, can be learned from the value of the increase coefficient K, that is, the amount of increase of the injection time of the hydrocarbons.

Therefore, in this embodiment according to the present invention, the above-mentioned clogging degree detecting means is used to detect the clogging degree from the amount of increase of the injection time of hydrocarbons when temperature elevation control is being performed.

Figure 26:
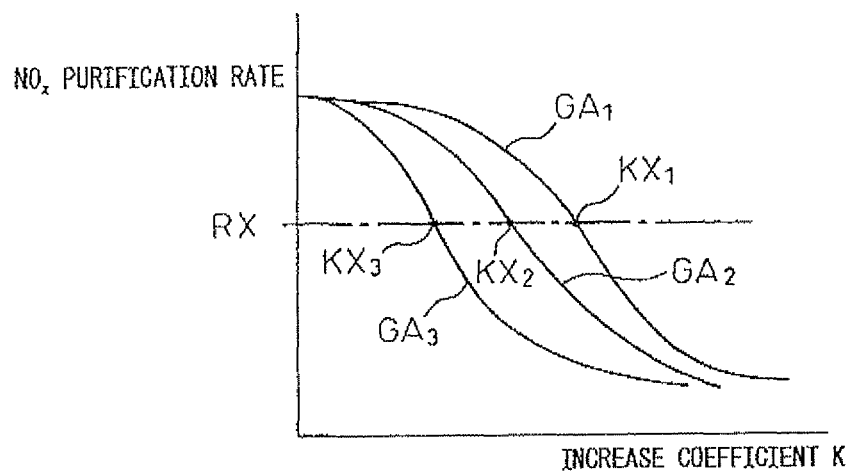
FIG. 26 is a view showing a relationship between an increase coefficient K and an $NO_x$ purification rate.
Figure 27:
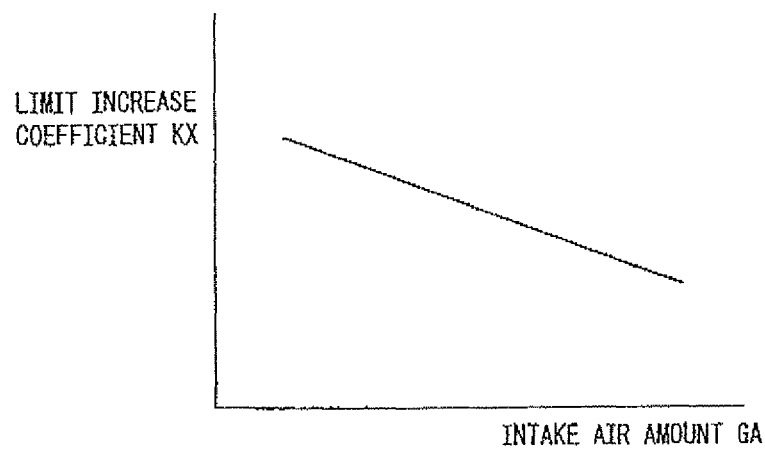
FIG. 27 is a view showing a relationship between an intake air amount and a limit increase coefficient KX.

FIG. 26 shows the relationship between the increase coefficient K and the $NO_x$ purification rate. Note that, the three solid lines $GA_1$, $GA_2$, and $GA_3$ in FIG. 26 respectively express equivalent intake air amount lines and are in a relationship, for the intake air amounts, of $GA_1 < GA_2 < GA_3$. Further, in FIG. 26, RX shows the allowable $NO_x$ purification rate, while $KX_1$, $KX_2$, and $KX_3$ show limit values of the increase coefficient K, that is, the limit increase coefficient when the intake air amounts are $GA_1$, $GA_2$, and $GA_3$ and the $NO_x$ purification rate becomes the allowable $NO_x$ purification rate RX. As shown in FIG. 27, this limit increase coefficient KX becomes lower the greater the intake air amount GA.

In this embodiment according to the present invention, when the $NO_x$ purification rate becomes the allowable $NO_x$ purification rate or less, that is, when the increase coefficient K exceeds the limit increase coefficient KX in accordance with the intake air amount, it is judged that a good $NO_x$ purification action cannot be obtained even if using the new $NO_x$ purification method. At this time, for example, an alarm light is turned on. Further, in this embodiment according to the present invention, at this time, the new $NO_x$ purification method is switched to an $NO_x$ purification method utilizing $NO_x$ storage reduction.

Further, as explained above, in this embodiment according to the present invention, if the clogging rate of the nozzle opening 15a, that is, the clogging degree of the nozzle opening 15a, increases, the increase coefficient K increases. Therefore, in this embodiment of the present invention, if stated another way, when the degree of clogging of the nozzle opening 15a of the hydrocarbon feed valve 15 exceeds a predetermined degree, it is judged that the $NO_x$ purification rate has become the allowable $NO_x$ purification rate RX or less and, at this time, for example, an alarm light is turned on. In this case, this predetermined degree is made larger the more the intake air amount increases.

On the other hand, in this embodiment according to the present invention, when the degree of clogging of the nozzle opening 15a of the hydrocarbon feed valve 15 exceeds a predetermined degree, that is, when it is judged that the $NO_x$ purification rate is an allowable $NO_x$ purification rate RX or less, a $No_x$ purification method is switched to another $NO_x$ purification method for removing $No_x$ by switching the air-fuel ratio of the exhaust gas flowing into the exhaust purification catalyst 13 from lean to rich by a period longer than the predetermined feed period, that is, an $NO_x$ purification method using the $NO_x$ storage reduction.

Next, referring to FIG. 28 and FIG. 29, the routine for calculation of the increase coefficient K will be explained. This routine is executed by interruption every predetermined time.

Figure 28:
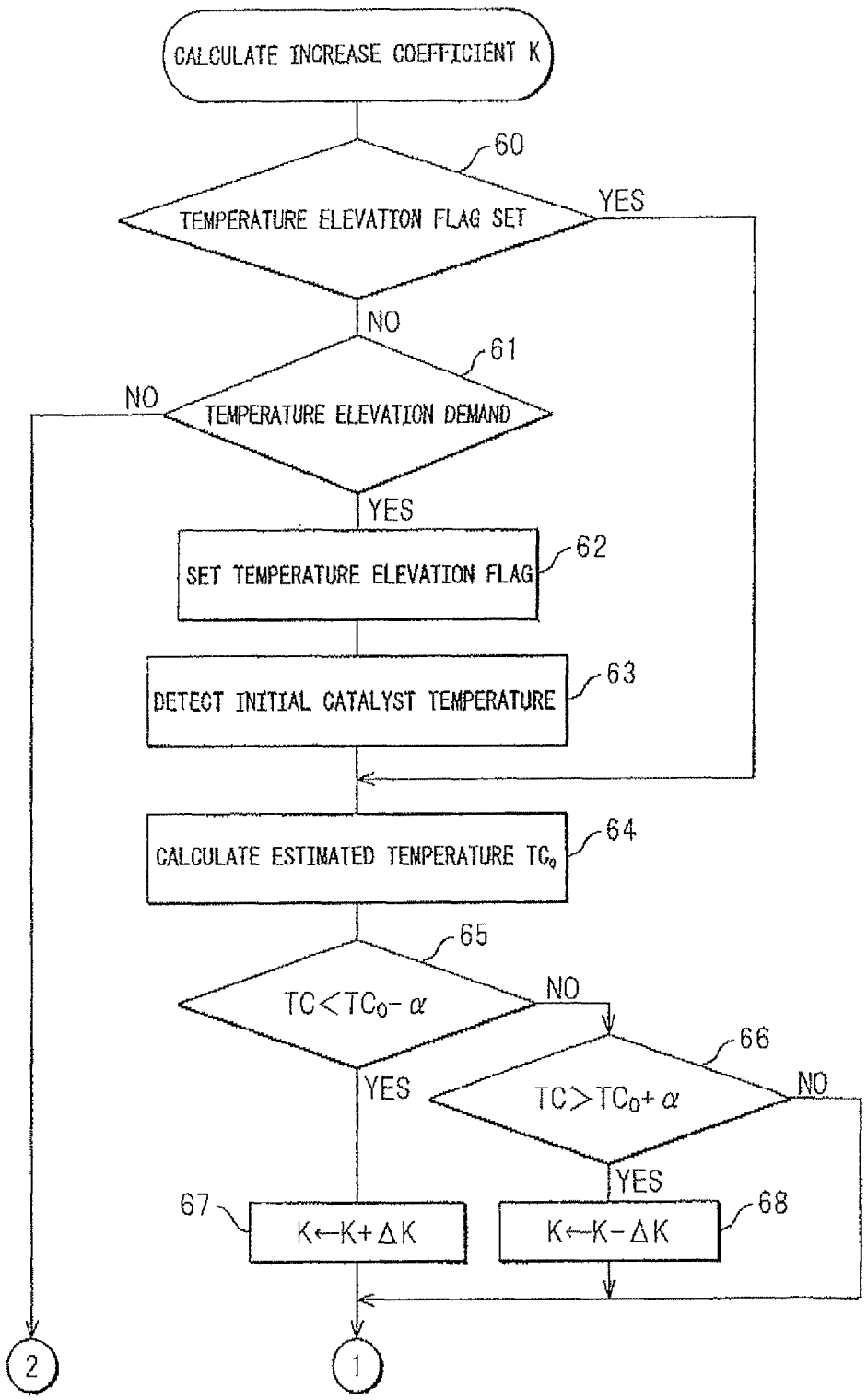
FIG. 28 and FIG. 29 are flow charts for calculation of an increase coefficient K.
Figure 29:
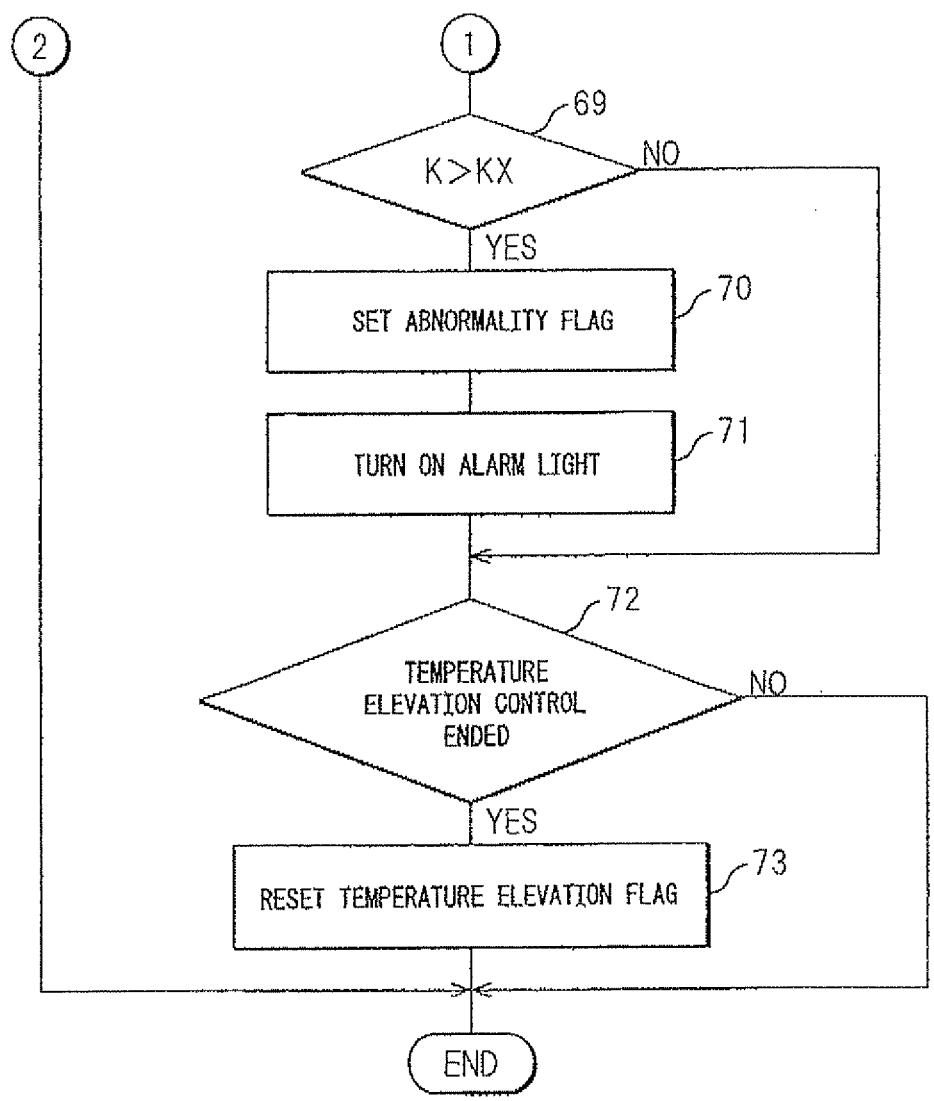

Referring to FIG. 28, first, at step 60, it is judged if a temperature elevation flag showing that the particulate filter 14 should be raised in temperature is set. When the temperature elevation flag is not set, the routine proceeds to step 61 where it is judged if a demand has been made to raise the temperature of the particulate filter 14. If no demand has been made to raise the temperature of the particulate filter 14, the processing cycle ends.

As opposed to this, when a demand is made for raising the temperature of the particulate filter 14, the routine proceeds to step 62 where the temperature elevation flag is set. Next, at step 63, the current temperature TC of the exhaust purification catalyst TC, that is, the initial catalyst temperature, is detected from the temperature sensors 23 and 34. Next, at step 64, this initial catalyst temperature is made the estimated temperature $T_0$ of the exhaust purification catalyst 13, next, the routine proceeds to step 65. Note that, this estimated temperature $T_0$ is made to increase along with the elapse of time along the curve shown in FIG. 22. If, at step 62, the flag is set, after that the routine jumps from step 60 to step 64.

At step 65, it is judged if the actual temperature TC of the exhaust purification catalyst 13 which is detected by the temperature sensors 23 and 24 is lower than the value of the estimated temperature $TC_0$ minus a small constant value α ($TC_0-α$). When $TC \geq TC_0-α$, the routine proceeds to step 66 where it is judged if the actual temperature TC of the exhaust purification catalyst 13 is larger than the value of the estimated temperature $TC_0$ plus a small constant value α ($TC_0+α$). When $TC \leq TC_0+α$, the routine proceeds to step 69.

On the other hand, when it is judged at step 65 that $TC<TC_0-α$, the routine proceeds to step 67 where the increase coefficient K is increased by a certain value ΔK. Next, the routine proceeds to step 69. Further, when, at step 66, it is judged that $TC>TC_0+α$, the routine proceeds to step 68 where the increase coefficient K is decreased by the certain value ΔK. Next, the routine proceeds to step 69. That is, the increase coefficient K is made to increase or decrease so that the actual temperature TC of the exhaust purification catalyst 13 becomes the estimated temperature $TC_0$.

At step 69, it is judged if the increase coefficient K exceeds the limit increase coefficient KX shown in FIG. 27. When K>KX, the routine proceeds to step 70 where the abnormality flag is set, next, at step 71, an alarm light is turned on. Next, at step 72, it is judged if the temperature elevation control has been completed. When the temperature elevation control has been completed, the routine proceeds to step 73 where the temperature elevation flag is reset.

Next, referring to FIG. 30, a control routine for injection of hydrocarbons will be explained.

Referring to FIG. 30, first, at step 80, it is judged if the temperature elevation flag is set. If the temperature elevation flag is not set, the routine proceeds to step 81 where it is judged if the abnormality flag is set. If the abnormality flag is not set, the routine proceeds to step 82 where the new $NO_x$ purification method is executed.

That is, first, at step 82, the injection time W is calculated from the map shown in FIG. 19, next, at step 83, this injection time W is multiplied with the increase coefficient K to calculate the final injection time WT. Note that, usually, K=1.0. Therefore, usually the final injection time WT is made the injection time W which is calculated from the map. Next, at step 84, the injection period ΔT is calculated in accordance with the engine operating state. Next, at step 85, hydrocarbons are injected from the hydrocarbon feed valve 15 by the injection period ΔT during the injection time WT.

On the other hand, when it is judged at step 80 that the temperature elevation flag is set, the routine proceeds to step 86 where temperature elevation control is performed. That is, first, at step 86, the injection time WH is calculated from the map shown in FIG. 21, next, at step 87, this injection time WH is multiplied with the increase coefficient K to calculate the final injection time WT. Note that, the value of the increase coefficient K is normally 1.0. The value K of this increase coefficient K increases if the nozzle opening 15a is clogged. Next, at step 88, the injection period ΔT in accordance with the operating state of the engine is calculated, then, at step 89, hydrocarbons are injected from the hydrocarbon feed valve 15 by the injection period ΔT during the injection time WT.

On the other hand, when it is judged at step 82 that the abnormality flag is set, the routine proceeds to step 90 where the $NO_x$ purification method utilizing the $NO_x$ storage reducing action shown in FIGS. 7A and 7B to FIG. 11 is performed.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst 14 . . . particulate filter
15 . . . hydrocarbon feed valve

The invention claimed is:

1. An exhaust purification system of an internal combustion engine comprising:
   a hydrocarbon feed valve for feeding hydrocarbons is arranged inside of an engine exhaust passage,
   an exhaust purification catalyst for reacting NOx and reformed hydrocarbons contained in exhaust gas arranged downstream of the hydrocarbon feed valve inside of the engine exhaust passage,
   a precious metal catalyst is carried on an exhaust gas flow surface of the exhaust purification catalyst and a basic exhaust gas flow surface part is formed around the precious metal catalyst,
   wherein the NOx which is contained in exhaust gas is reduced in the exhaust purification catalyst if a predetermined amount of hydrocarbons is injected by a predetermined feed period from the hydrocarbon feed valve and NOx which is contained in exhaust gas is stored in the exhaust purification catalyst if the feed period of the hydrocarbons is lengthened more than the predetermined feed period, and
   an electronic control unit configured to detect a degree of clogging of a nozzle opening of the hydrocarbon feed valve, inject the predetermined amount of hydrocarbons from the hydrocarbon feed valve by the predetermined feed period at the time of engine operation, and, at this time, estimate an NOx purification rate from the clogging degree of the nozzle opening of the hydrogen feed valve which is detected by the electronic control unit,
   wherein when the clogging degree of the nozzle opening of the hydrocarbon feed valve exceeds a predetermined degree, the electronic control unit judges that the NOx purification rate has become an allowable NOx purification rate or less.

2. An exhaust purification system of an internal combustion engine as claimed in claim 1, wherein when it is judged that the NOx purification rate has become said allowable NOx purification rate or less, an air-fuel ratio of the exhaust gas flowing into the exhaust purification catalyst is switched from lean to rich by a period longer than the predetermined feed period.

3. An exhaust purification system of an internal combustion engine as claimed in claim 1, wherein said predetermined degree is made smaller the more an intake air amount increases.

4. An exhaust purification system of an internal combustion engine as claimed in claim 1, wherein a temperature elevation control which makes a temperature of a catalyst or particulate filter which is arranged inside of the engine exhaust passage rise to a target temperature by increasing an injection time of hydrocarbons from said hydrocarbon feed valve is performed by the electronic control unit, wherein said electronic control unit detects the clogging degree from an increased amount of injection time of the hydrocarbons when said temperature elevation control is being performed.

5. An exhaust purification system of an internal combustion engine as claimed in claim 1, wherein said precious metal catalyst is used to react NOx contained in exhaust gas and reformed hydrocarbons so as to form a reducing intermediate containing nitrogen and hydrocarbons, the formed reducing intermediate is held on said basic exhaust gas flow surface part, a reducing action of the reducing intermediate held on the basic exhaust gas flow surface part is used to reduce NOx, and said predetermined feed period of the hydrocarbons is a feed period required for continuous production of the reducing intermediate.

6. An exhaust purification system of an internal combustion engine as claimed in claim 1, wherein said precious metal catalyst is comprised of platinum Pt and at least one of rhodium Rh and palladium Pd.

7. An exhaust purification system of an internal combustion engine as claimed in claim 1, wherein on the exhaust gas flow surface of said exhaust purification catalyst, a basic layer which includes an alkali metal, alkali earth metal, rare earth, or metal which can donate electrons to NOx is formed and wherein the surface of said basic layer forms said basic exhaust gas flow surface part.

8. An exhaust purification system of an internal combustion engine comprising:
   a hydrocarbon feed valve for feeding hydrocarbons arranged inside of an engine exhaust passage,
   an exhaust purification catalyst for reacting NOx and reformed hydrocarbons contained in exhaust gas arranged downstream of the hydrocarbon feed valve inside of the engine exhaust passage,
   a precious metal catalyst carried on an exhaust gas flow surface of the exhaust purification catalyst and a basic exhaust gas flow surface part is formed around the precious metal catalyst,
   wherein the NOx which is contained in exhaust gas is reduced in the exhaust purification catalyst if a predetermined amount of hydrocarbons is injected by a predetermined feed period from the hydrocarbon feed valve and NOx which is contained in exhaust gas is stored in the exhaust purification catalyst if the feed period of the hydrocarbons is lengthened more than the predetermined feed period, and
   an electronic control unit configured to detect a degree of clogging of a nozzle opening of the hydrocarbon feed valve, inject the predetermined amount of hydrocarbons from the hydrocarbon feed valve by the predetermined feed period at the time of engine operation, and, at this time, estimate an NOx purification rate from the clogging degree of the nozzle opening of the hydrogen feed valve which is detected by the electronic control unit,
   wherein a temperature elevation control which makes a temperature of a catalyst or particulate filter which is arranged inside of the engine exhaust passage rise to a target temperature by increasing an injection time of hydrocarbons from said hydrocarbon feed valve is performed by the electronic control unit, wherein said electronic control unit detects the clogging degree from an increased amount of injection time of the hydrocarbons when said temperature elevation control is being performed.

9. An exhaust purification system of an internal combustion engine as claimed in claim 8, wherein said precious metal catalyst is used to react NOx contained in exhaust gas and reformed hydrocarbons so as to form a reducing intermediate containing nitrogen and hydrocarbons, the formed reducing intermediate is held on said basic exhaust gas flow surface part, a reducing action of the reducing intermediate held on the basic exhaust gas flow surface part is used to reduce NOx, and said predetermined feed period of the hydrocarbons is a feed period required for continuous production of the reducing intermediate.

10. An exhaust purification system of an internal combustion engine as claimed in claim 8, wherein said precious metal catalyst is comprised of platinum Pt and at least one of rhodium Rh and palladium Pd.

11. An exhaust purification system of an internal combustion engine as claimed in claim 8, wherein on the exhaust gas flow surface of said exhaust purification catalyst, a basic layer which includes an alkali metal, alkali earth metal, rare earth, or metal which can donate electrons to NOx is formed and wherein the surface of said basic layer forms said basic exhaust gas flow surface part.

12. An exhaust purification system of an internal combustion engine as claimed in claim 8, wherein when the clogging degree of the nozzle opening of the hydrocarbon feed valve exceeds a predetermined degree, the electronic control unit judges that the NOx purification rate has become an allowable NOx purification rate or less.

13. An exhaust purification system of an internal combustion engine as claimed in claim 12, wherein when it is judged that the NOx purification rate has become said allowable NOx purification rate or less, an air-fuel ratio of the exhaust gas flowing into the exhaust purification catalyst is switched from lean to rich by a period longer than the predetermined feed period.

14. An exhaust purification system of an internal combustion engine as claimed in claim 12, wherein said predetermined degree is made smaller the more an intake air amount increases.

* * * * *